United States Patent Office 3,441,109
Patented Apr. 29, 1969

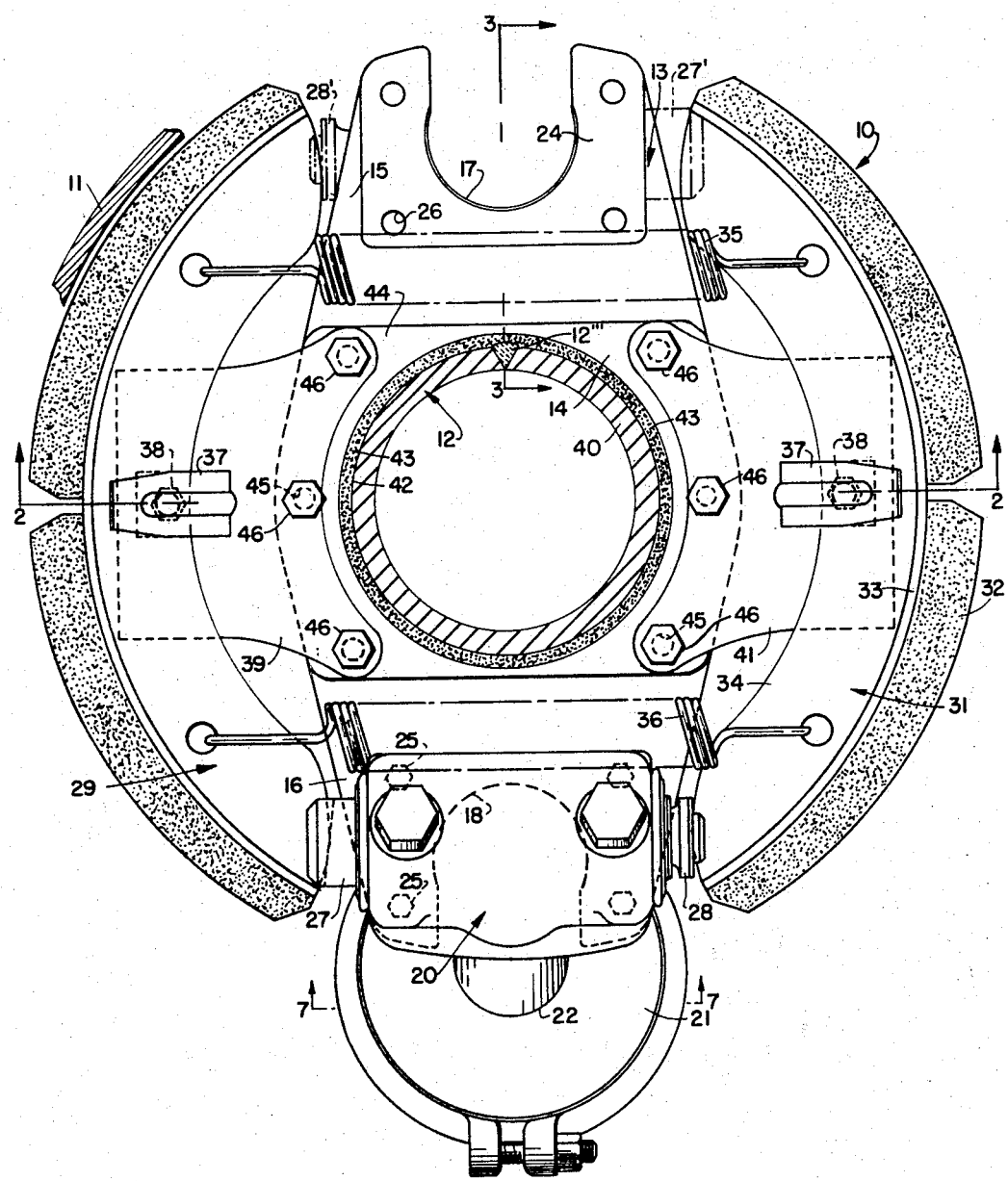

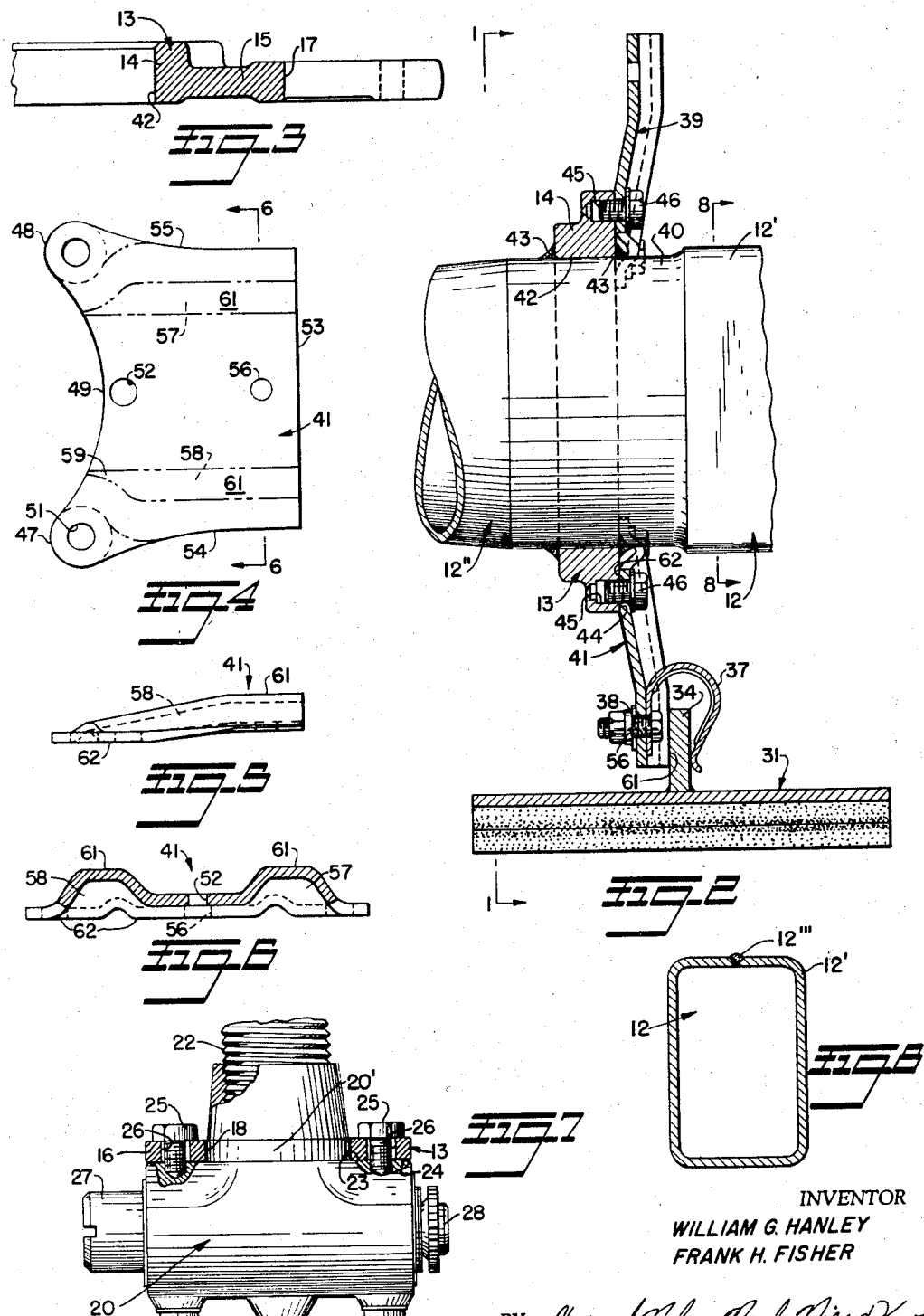

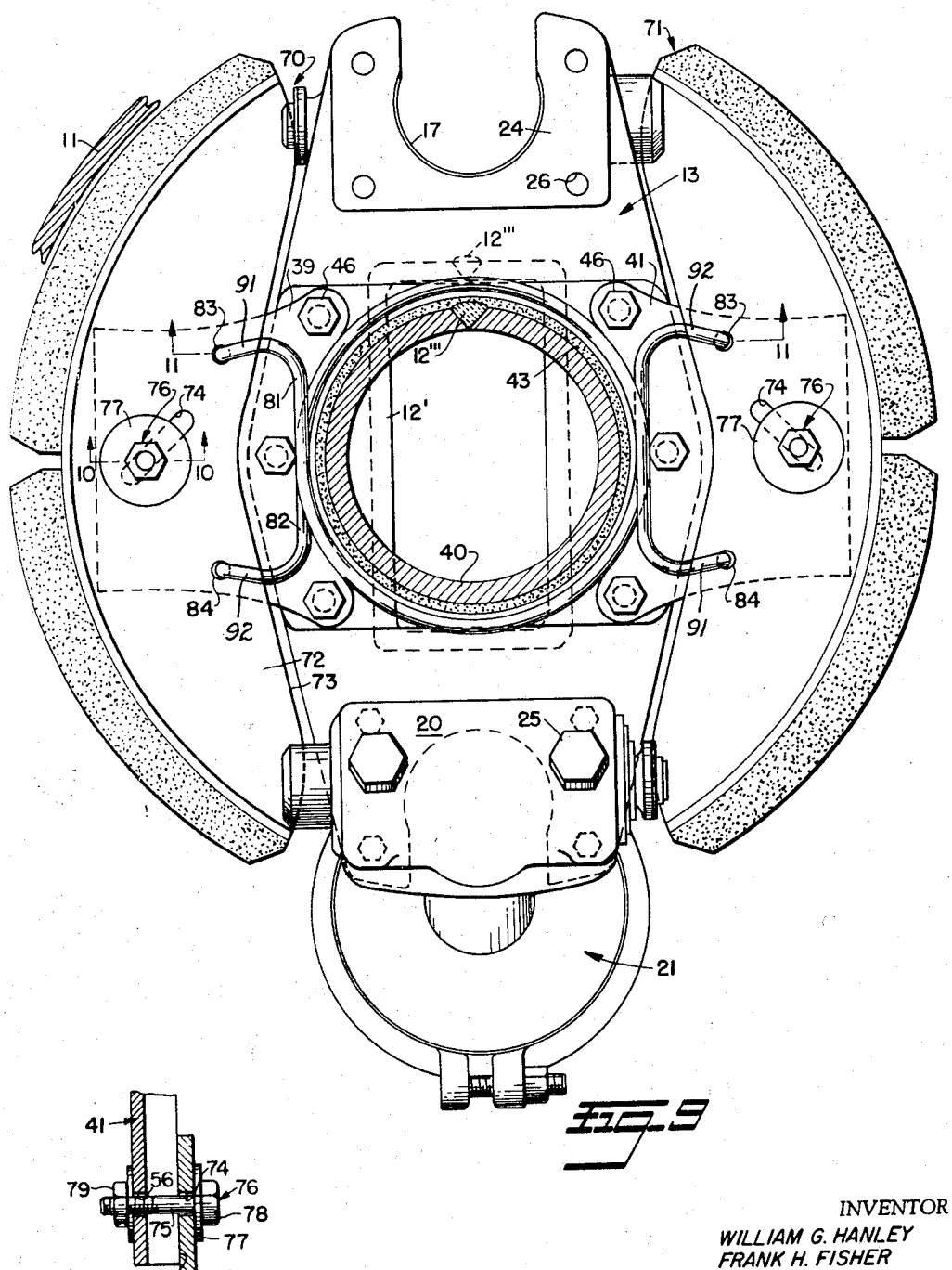

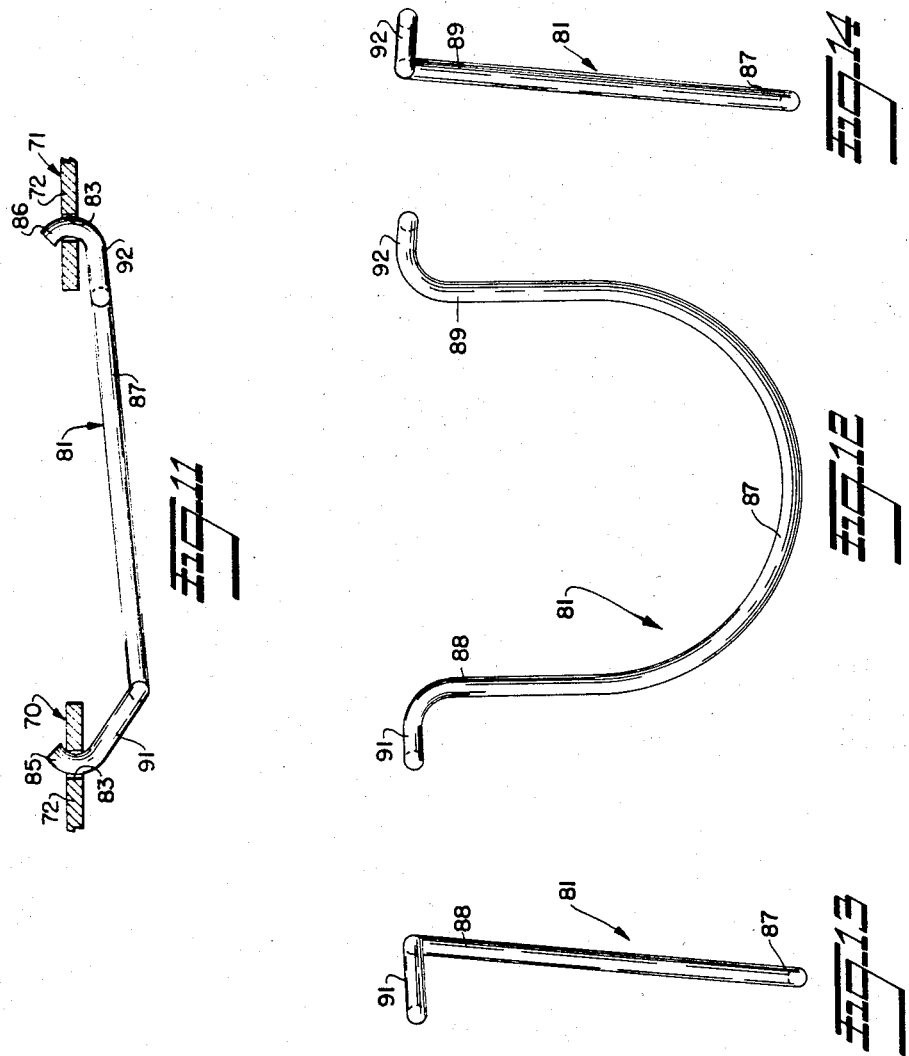

3,441,109
BRAKE MECHANISM SUPPORT
William G. Hanley and Frank H. Fisher, Kenton, Ohio, assignors, by mesne assignments, to Rockwell-Standard Company, Pittsburgh, Pa., a corporation of Delaware
Original application Aug. 12, 1965, Ser. No. 479,222, now Patent No. 3,378,113. Divided and this application Aug. 28, 1967, Ser. No. 674,031
Int. Cl. F16d 51/00
U.S. Cl. 188—78    4 Claims

ABSTRACT OF THE DISCLOSURE

A vehicle brake assembly mounted on a non-rotatable axle member comprises a rigid brake mechanism support fixed as by welding on the axle member, with a plurality of brake shoe assemblies slidably mounted on the support and actuator units mounted on the support between the opposite ends of adjacent brake shoe assemblies. Return spring means interconnecting opposite brake shoe assemblies comprise at least two separate oppositely facing U-shaped springs extending around opposite sides of the axle member with their ends anchored in the brake shoe assemblies.

---

This is a division of my copending application Ser. No. 479,222, fixed Aug. 12, 1965 for Brake Mechanism Support, now patent No. 3,378,113.

The present invention refers to brake mechanism supports and more in particular to such for the mounting of brake shoe assemblies and actuator units in association on a vehicle axle member such as a tubular trailer beam or a drive axle housing.

In brakes of the wedge actuated type such as disclosed in U.S. Lettters Patent No. 3,037,584, F. T. Cox et al., the brake shoes and the actuator are supported on a central support plate or spider which may be made from a casting, forging or stamping formed with an integral actuator housing or housings, anchor bosses and guide abutments for the brake shoes. These support plates or spiders are usually very heavy and, due to their intricate shape which includes the actuator housings and brake shoe mounting flanges, expensive to manufacture. Furthermore, those prior support plates or spiders have usually been bolted onto a flange on the axle, a structure that might give rise to misalignment of the brake mechanism due to the relative large uncontrolled manufacturing tolerances in the bolted assembly. It is an important feature of the invention to ringweld a special brake support arrangement directly to the axle to eliminate the disadvantages of such bolted assembly. A support plate or spider welded directly to the axle is more desirable economically by eliminating assembly costs and time consumed by the bolted assembly.

These prior one-piece support plates or spider structures do not readily lend themselves to be ringwelded to the axle in automatic welding machines due to their intricate structure which would interfere with the indexing and alignment means of the welder.

The present invention provides a novel composite brake support or spider structure adapted to overcome the foregoing disadvantages of prior structures. In the disclosed embodiments of the invention the brake spider structure is a fabricated assembly consisting essentially of an elongated, apertured forged spider adapted to be welded directly to the axle and having yoked ends provided with outwardly open recesses to receive the respective brake actuator housings, together with separate brake shoe support brackets attached to the spider intermediate the yoked ends to support and guide the brake shoes. This special structure is lighter in weight, lends itself to be more easily welded onto the axle, and the parts are better aligned in the assembly.

The major object of the present invention is therefore to provide a novel brake mechanism support assembly comprising an axle mounted spider having oppositely open actuator housing mounting recesses and attached separate brake shoe mounting brackets.

Another object of the invention is to provide a novel brake mechanism mounting structure comprising a spider apertured to fit over and be directly welded upon an axle housing or beam, with oppositely open brake shoe actuator recesses formed therein, and having oppositely disposed brake shoe brackets attached thereto intermediate the recesses.

It is a further object of the invention to provide a novel axle beam and brake mechanism support assembly wherein an apertured elongated spider fits over the beam and is welded in place, the brake shoes are mounted on diametrically opposed brackets removably attached to the spider, and actuator units are detachably mounted on the spider between the ends of the brake shoes, and the individual novel components of such assembly.

Further objects of the invention will appear from the following specification in connection with the appended claims and the attached drawings wherein:

FIGURE 1 is a side elevation partly in section illustrating a brake assembly incorporating a preferred embodiment of the invention;

FIGURE 2 is a section through the brake of FIGURE 1 substantially on line 2—2 of FIGURE 1, with one of the brake shoes removed for clarity of illustration;

FIGURE 3 is a fragmentary view in section through an actuator mounting portion of the spider substantially along line 3—3 of FIGURE 1;

FIGURE 4 is an elevational view of one of the brake shoe support brackets;

FIGURE 5 is a side elevation of the bracket of FIGURE 4;

FIGURE 6 is a section through one brake shoe support bracket substantially along line 6—6 of FIGURE 4;

FIGURE 7 is a fragmentary view partly in section showing the mounting of an actuator housing upon the spider;

FIGURE 8 is a section substantially along line 8—8 of FIGURE 2 showing the rectangular cross section of the trailer axle beam between the integral wheel mounting spindles;

FIGURE 9 is a side elevation partly in section illustrating a brake assembly like FIGURE 1 but showing a different brake shoe structure and mounting;

FIGURE 10 is a fragmentary section at line 10—10 of FIGURE 9 showing the retainer mounting of the brake shoe on the support bracket;

FIGURE 11 is a fragmentary section generally on line 11—11 of FIGURE 9 showing attachment of a U-shaped return spring to the brake shoes; and FIGURES 12, 13 and 14 are respectively side and opposite end views of the U-shaped brake shoe return spring.

FIGURE 1 shows a vehicle brake mechanism assembly 10 enclosed by the usual brake drum assembly indicated at 11. Assembly 10 is supported upon an axle assembly 12 which is preferably a hollow tubular trailer axle beam having a rectangular cross section center portion 12' of uniform size extending between identical integral cylindrical brake spider mounting and wheel bearing spindle end portions 12''. As indicated in FIGURES 1 and 2, the axle beam 12 is preferably made by transversely bending of a single sheet of metal to the required contour and welding the opposite longitudinal edges of the sheet along the straight weld line 12''' which in the axle assembly is disposed in the plane containing the line of action of the actuators, which would be the plane indicated by line 3—3 in FIGURE 1 and passing through the center of the axle beam. The brake mechanism support phase of the invention may equally well be applied to other axle beams and to drive axle housings.

Assembly 10 comprises an integral elongated spider 13 which has a central relatively thick annular body section 14 and diametrically projecting arms 15 and 16 that are formed with opposite generally semicircular bottom outwardly open V-shaped recesses 17 and 18 each adapted to receive a brake actuator housing 20. Actuator housing 20 may be of the type disclosed in U.S. Patent No. 3,037,584 to F. T. Cox et al., enclosing a wedge, roller and associated plunger mechanism (not shown) powered by a fluid motor unit 21 which is attached by means of a tubular member 22 to the actuator housing.

As shown in FIGURE 7, each housing 20 has a flat surface 23 adapted to be flush with a flat pad surface 24 on the spider arm, and four machine screws 25 extend through suitable openings 26 in the spider arm to secure the actuator housing to the spider. Each housing 20 has a cylindrical section 20' which is machined to have a snug tight fit in recess 17 (or 18) so that in the assembly none of the brake operation stresses are borne by screws 25. Pad surfaces 24 surround the spider recesses 17 and 18 and lie in a common plane normal to the axis of the axle. The actuators 20 with motors 21 attached may be readily removed from the support assembly after screws 25 are removed, through the open outer ends of recesses 17 and 18.

Actuator housing 20 contains plungers 27 and 28 which extend outwardly in opposite directions for abutment and nonrotatable attachment to the webs of opposite brake shoes 29 and 31 respectively. One of these plungers, as that at 28, may be automatically adjustable in length as disclosed in U.S. Patent No. 3,068,964 to W. J. Williams to compensate for brake lining wear.

At the other ends of the brake shoes similar plungers 27' and 28' are indicated in phantom lines in FIGURE 1, the upper actuator housing being omitted in FIGURE 1 to better illustrate the spider structure.

Brake shoes 29 and 31 each comprise linings 32 secured to arcuate flanges 33 and central webs 34. The brake shoes are normally held retracted with respect to drum 11 and urged against the actuator plungers by balanced upper and lower return springs 35 and 36 attached between the respective webs. The brake shoes are further mounted and guided against tilting and to keep them centered in relation to the drum, by U-shaped intermediate spring clips 37 which are attached by screw and nut assemblies 38 to the outer ends of special brake shoe support brackets 39 and 41, as best illustrated in FIGURE 2. Spring clips 37, which overlie the flat web portions of the brake shoes, retain the brake shoes securely against flat surfaces of support brackets 39 and 41 and thus in centered position within the brake mechanism as will appear.

With particular reference to FIGURE 1 the brake spider 13 is of oblong somewhat diamond-shaped configuration provided with a large central body aperture 42 of a diameter corresponding to the external diameter of the cylindrical brake spider mounting section 40 of the axle tube 12 to enable the spider to be pressed over the axle. Once spider 13 is properly located longitudinally on the axle beam it is permanently ringwelded thereto as shown at 43 so that the axle beam and the two brake spiders form a rigid integral unit assuring secure attachment and centering of the brake mechanism at each end of the axle.

Each spider 13 is formed on one side with a raised central portion providing a generally annular flat pad surface 44 lying in the same plane with pad surfaces 24 so that all three pad surfaces can be precisely machined and ground or otherwise formed at the same time and with the same machine set-up.

The central pad section 44 is provided with identical groups of threaded bores 45 located at opposite sides of the axle in equally spaced relation to both sides of the minor axis of spider 13 adapted to receive screws 46 which attach the brake shoe support brackets 39 and 41 to spider 13.

FIGURES 4–6 illustrate details of these brake shoe support brackets and since they are identical only one will be described.

Brake shoe support bracket 41 may be stamped or forged from a single piece of metal to assume a substantially rectangular shape, two adjacent corners of which extend outwardly into rounded wing formations 47 and 48 connected by an inner circular edge surface 49 whose curvature corresponds to the curvature of the outer periphery of axle beam 12. Each of these wing formations is provided with the aperture 51 aligned in the assembly of FIGURE 1 with threaded spider bores 45, and another aperture 52 is provided immediately adjacent the circular edge surface 49 intermediate the other two bores in alignment with another threaded spider bore 64.

The outer edge surface 53 opposite the circular edge surface 49 is straight and is joined to the wing formations by oppositely curved sides 54 and 55. A smaller aperture 56 is radially aligned with the central aperture 52 adjacent the straight outer edge 53 to receive the screw and nut assembly 38 for the hold down spring clip 37 as shown in FIGURE 2.

Bracket 41 is formed on opposite sides with two stamped out ridges 57 and 58 which extend from outer edge 53 towards the inner circular edge 49 adjacent which they taper in width at 59. These ridges 57 and 58 are provided for reinforcement and adjacent the outer portion they provide a two point bearing surface for the brake shoe web 34 of the brake shoes. This bearing surface as shown in FIGURES 5 and 6 consists of the flat smooth coplanar upper ridge surfaces 61. In the assembly as shown in FIGURE 1 these bearing surfaces 61 slidably engage the inner parallel smooth side surface of the brake shoe web, and the spring clip 37 resiliently bears on the outer surface of the brake shoe web, so that in the assembly the brake shoes are supported and guided for movement essentially in a plane radially of the axle.

Brake shoe bearing surfaces 61 are disposed in a plane spaced from the central plane of the spider at such predetermined distance that when the brake is completely assembled as in FIGURE 1 the brake shoe webs will be aligned with the central axes of the actuator plungers 27 and 28, and this relationship will be constantly maintained throughout the operational life of the brake.

At the inner side, bracket 41 is formed with an inner flat surface indicated at 62 fitting flush upon spider pad surface 44 whereby when screws 46 are inserted and drawn tight the bracket is rigidly secured in radially extending relation upon spider 13 with inner edge surface 49 circumferentially contacting the periphery of axle beam 12.

The spider 13 and the separate brackets 39 and 41 may be simple forgings or stampings which are easily machined where necessary. The spider can be welded to the axle with less difficulty than prior complex spider structures, and this integral welding of the spider to the axle beam provides the further advantage that centralizing errors caused by an accumulation of machining tolerances in conventional flange and bolt structures is completely eliminated. The unique outwardly open actuator housing mounting openings 17 and 18 in the spider ends allow the fast and easy removal of the complete actuating mechanisms with motor attached without the necessity of disturbing the precisely adjusted brake actuating mechanism within the actuator housing by having to disassemble the fluid motor from the actuator housing. The separate brackets for brake support eliminate the need for expensive machining and complex spider shapes.

FIGURES 9-14 illustrate a further preferred embodiment of the invention wherein the brake shoes are differently mounted on the brackets and connected by a different return spring arrangement.

The brackets 39 and 41 are the same as in FIGURES 1-8 and secured to the same spider 13 in the same manner as by bolts 46.

Brake shoes 70 and 71 in this embodiment are similar to the brake shoes 29 and 31 as far as the lining mounting is concerned, but in each of shoes 70 and 71 the web 72 is wider and in fact has an inner edge 73 similar in contour to the adjacent side of spider 13. Also each web 72 is formed with a substantially centered angular guide slot 74 which slidably fits with the cylindrical shank of a guide pin 75 which in this form is the shank of a bolt assembly 76 passing through slot 74 and the bracket aperture 56 as shown in FIGURE 10.

Bolt assembly 76 comprises a large diameter washer 77 interposed slidably between the enlarged bolt head 78 and one side of shoe web 72, and a nut and washer assembly 79 on the threaded end of the bolt which when drawn to a suitable extent slidably retains the shoe web 72 against the flat guide surface 61 of the mounting bracket as shown in FIGURE 10.

Slots 74 of the respective shoes are oppositely inclined at opposite sides of the axle center, and the inclination is such as to permit counterclockwise shoe displacement upon engagement of the shoes with the drum when the actuators 20 are operated to apply the brakes.

A special return spring arrangement is provided in the FIGURE 9 embodiment. Two substantially identical U-shaped springs 81 and 82 are provided. As shown in FIGURE 9, each brake shoe web has two apertures 83 and 84 which are disposed at equal distances from a center plane bisecting the shoe and substantially containing line 10—10. A line interconnecting the centers of the apertures 83 and 84 in each shoe intersects that center plane at right angles.

One spring 81 has its opposite hooked ends 85 and 86 inserted within the apertures 83 of the respective brake shoes. Referring to FIGURES 11-14 it will be seen that spring 81 is formed from a single length of wire stiff enough to be shape retaining and yet resilient enough for the purpose. Spring 81 comprises an intermediate loop 87 which extends around the underside of the axle beam, substantially parallel side arms 88 and 89 lying in the plane of the loop terminating in oppositely outwardly extending end arms 91 and 92 which in turn have their terminals formed with arcuate hooks 85 and 86.

As shown in FIGURES 11 and 14, end arm 92 also lies in the plane of the loop 87, but arm 91 is longer than arm 92 and inclined with respect to the plane of the loop, so that when spring 81 is attached between the opposite brake shoes the plane of loop 87 will be disposed at a slight angle to the axis of the axle beam.

Similarly spring 82 has its opposite hooked ends inserted into brake shoe apertures 84 and its loop extends around the upper side of the axle beam, but with hook 85 attached to shoe 71 and hook 86 attached to shoe 70. By this arrangement the springs 81 and 82 do not interfere with each other and the opposite angularities of their loop sections, extending in intersecting planes transverse to the axis of the axle member 40, balance.

Each spring 81 and 82 is of such characteristics as to normally seek a relaxed position wherein the brake shoes are pulled toward engagement with the actuator plungers, and they are expanded equally when the actuators force the brake shoes toward drum engagement.

What is claimed and desired to be secured by Letters Patent is:

1. In a vehicle brake assembly adapted for mounting upon a nonrotatable axle member extending transversely of the vehicle, a support rigid with said axle member, opposed brake shoe assemblies slidably mounted upon said support, actuator units mounted on said support between opposite ends of said brake shoe assemblies, and return spring means extending between said brake shoe assemblies comprising two separate oppositely facing substantially U-shaped similar springs having their respective loop sections extending in intersecting planes around opposite sides of said axle member and having their opposite ends anchored in the respective brake shoe assemblies, said springs being disposed and arranged for non-interfering balanced cooperative action in the assembly.

2. In the brake assembly defined in claim 1, said springs each being formed from a single length of wire and comprising an intermediate loop having substantially parallel side arms extending in the plane of the loop and terminating in oppositely outwardly extending end arms that have hooked terminals inserted into apertures in said brake shoe assemblies.

3. In the brake assembly defined in claim 2, each spring having one of said end arms lying in the plane of said loop, with the other end arm being longer than said one end arm and inclined with respect to the plane of the loop, so that said springs are disposed in noninterfering relation in said assembly.

4. In the brake assembly defined in claim 1, wherein said loop sections of said springs extend in intersecting planes of opposite angularity around said opposite sides of said axle member.

References Cited

UNITED STATES PATENTS 2,372,415 3/1945 Eksergian _____ 188—78
3,095,950 7/1963 Scheel _____ 188—78

FERGUS S. MIDDLETON, *Primary Examiner.*

T. W. BUCKMAN, *Assistant Examiner.*